(12) United States Patent
Hashimoto et al.

(10) Patent No.: US 8,083,474 B2
(45) Date of Patent: Dec. 27, 2011

(54) TURBOCHARGER

(75) Inventors: Shigeo Hashimoto, Tokyo (JP); Noboru Hamaguchi, Sagamihara (JP); Yasuaki Jinnai, Sagamihara (JP)

(73) Assignees: Tofuji E.M.I.CO., Ltd., Tokyo (JP); Mitsubishi Heavy Industries, Ltd., Tokyo (JP)

( * ) Notice: Subject to any disclaimer, the term of this patent is extended or adjusted under 35 U.S.C. 154(b) by 452 days.

(21) Appl. No.: 12/311,468

(22) PCT Filed: Oct. 1, 2007

(86) PCT No.: PCT/JP2007/069176
§ 371 (c)(1),
(2), (4) Date: Mar. 31, 2009

(87) PCT Pub. No.: WO2008/044520
PCT Pub. Date: Apr. 17, 2008

(65) Prior Publication Data
US 2010/0028142 A1 Feb. 4, 2010

(30) Foreign Application Priority Data
Oct. 6, 2006 (JP) .................. 2006-275312

(51) Int. Cl.
*F02D 23/00* (2006.01)
(52) U.S. Cl. ........ 415/160; 415/163; 415/164; 415/165; 415/191; 60/602

(58) Field of Classification Search .................. 415/150, 415/191, 160–166, 200; 417/405–407; 60/602
See application file for complete search history.

(56) References Cited

U.S. PATENT DOCUMENTS 7,396,240 B2 * 7/2008 Frederiksen et al. ......... 439/157
7,490,470 B2 * 2/2009 Jinnai et al. ..................... 60/602

FOREIGN PATENT DOCUMENTS

| JP | 2002-038967 A | 2/2002 |
| JP | 2002-337007 A | 11/2002 |
| JP | 2006-194176 A | 7/2006 |

OTHER PUBLICATIONS

International Search Report dated Dec. 4, 2007, issued on PCT/JP2007/069176.

* cited by examiner

*Primary Examiner* — Dung A. Le
(74) *Attorney, Agent, or Firm* — Edwards Wildman Palmer LLP

(57) ABSTRACT

To provide a turbocharger whose lifetime is long, which is capable of inexpensively and precisely performing nozzle vane angle synchronous control by using inexpensive and highly wear resistant components in a link mechanism for driving a rotation mechanism of nozzle vanes of an adjustable nozzle mechanism. As pins fixedly arrayed in a ring plate rotatably supported on the turbocharger, that set an angle of the nozzle vanes for controlling an amount of exhaust gas for rotating a turbine rotor, each pin in which a hard coating with a thickness of approximately 2 μm which is formed of Al, Cr, Si, and N by physical vapor deposition is formed onto an austenitic stainless steel as a base material, is used.

4 Claims, 3 Drawing Sheets

TURBOCHARGER

TECHNICAL FIELD

The present invention relates to a turbocharger for an engine, and in particular, to an exhaust turbocharger having an adjustable nozzle mechanism.

BACKGROUND ART

In many cases, an automobile engine, particularly, a diesel engine has an exhaust turbocharger mounted on in order to clean exhaust. There has been known a so-called adjustable nozzle turbocharger in which a plurality of adjustable nozzles are rotatably supported by pins installed on a ring plate, to adjust a flow velocity of exhaust by a link mechanism, as a turbocharger which is capable of stably operating in engine from low-speed rotation such as idling time to high-speed driving rotation by varying a velocity of gas flowing into a turbine (for example, refer to Patent Literature 1).
[Patent Literature 1] JP, 2006-194176, A

SUMMARY OF INVENTION

Technical Problem

However, because an adjustable nozzle turbocharger is driven without maintenance and without feeding oil at a high temperature of around 1000° C. over a long period, it is necessary to maintain high reliability in such environments. In particular, it is important to make it wear-resistant that a rotational system and a frictionally moving part of a link system in the adjustable nozzle mechanism. The durability of the pins installed on the ring plate as well is unexceptional, that is a major factor in determining the lifetime of the turbocharger.

Because wear resistance at a high temperature is required for the pins installed on the ring plate, a metal material with high hardness such as a cobalt alloy is used. A cobalt alloy has the advantage that its hardness at a high temperature is high, but has the disadvantage that it is expensive as a material, and wears away to shorten its lifetime. Further, because a cobalt alloy is brittle, there is the disadvantage that its cost of manufacturing is high because of a high yield of breakage in processing and manufacturing pins and at the time of pressing those to fit into the ring plate so as to assemble.

The present invention has been achieved in consideration of the above-described problems, and an object of the present invention is to provide a turbocharger whose lifetime is long and its cost of manufacturing is inexpensive by using pins whose lifetime is long due to its high wear resistance and which is inexpensive and its cost of manufacturing is low.

Solution to Problem

In order to achieve the above-described problems, a turbocharger according to a first aspect of the present invention includes a nozzle mount which rotatably supports a plurality of nozzle axes at regular intervals circumferentially, the nozzle axis are formed such that open-close levers having two-forked holding parts formed as their leading ends are fixed to one ends, and nozzle vanes that control an amount of exhaust gas to rotate a turbine rotor are fixed to the other ends, and a ring plate which has pins fixedly arrayed so as to correspond to the nozzle axes, to engage with the holding parts of the open-close levers, the ring plate is rotatably supported coaxially on the nozzle mount, and in the turbocharger the pins are formed such that stainless steel is used as a base material, and the base material is coated with a hard coating formed of Al, Cr, Si, and N by physical vapor deposition.

In addition, in the turbocharger according to a second aspect of the present invention, a coating thickness of the hard coating is more than or equal to 0.5 μm.

Furthermore, in the turbocharger according to a third aspect of the present invention, only one portion including a frictionally moving part of the base material is selectively coated with the hard coating.

Advantageous Effects of Invention

In accordance with the turbocharger according to the first aspect of the invention, the pins which are small members under a harsh high-temperature environment can be configured such that their surfaces have extremely high wear resistance, and their main bodies have elasticity to some extent, which are easy to be processed, it is possible to use the pins whose lifetime is long because of the elasticity of their main bodies and the wear resistance of their surfaces, and which are inexpensive and whose cost of manufacturing is low, which makes it possible to provide the turbocharger whose lifetime is long and whose cost of manufacturing is inexpensive.

In accordance with the turbocharger according to the second aspect of the invention, it is possible to provide a turbocharger whose durability is higher, which is free from dispersion and the quality is high in mass production.

In accordance with the turbocharger according to the third aspect of the invention, it is possible to provide the turbocharger which is free from dispersion and the quality is higher in mass production because the fixing strength of the pins to the ring plates is not degraded by preventing the hard coating which is a dissimilar material from being involved with the portions on which the pins are pressed into the ring plates.

The present specification incorporates the disclosure in the specification and/or the drawings of Japanese Patent Application No. 2006-275312 whose priority is claimed in the present application.

[Reference Signs List]

| | |
|---|---|
| 1: | Turbine housing |
| 2: | Scroll |
| 3: | Turbine rotor |
| 4: | Turbine shaft |
| 5: | Nozzle vane |
| 6: | Nozzle axis |
| 7: | Nozzle mount |
| 8: | adjustable nozzle mechanism |
| 9: | Crank mechanism |
| 10: | Lever |
| 11: | Sleeve |
| 81: | Ring plate |

| | |
|---|---|
| [Reference Signs List] | |
| 82: | Pin |
| 84: | open-close lever |
| 821: | Base material |
| 822: | Coating |

DESCRIPTION OF EMBODIMENTS

Hereinafter, a best mode for carrying out the present invention will be described with reference to the accompanying drawings.

Figure 1:
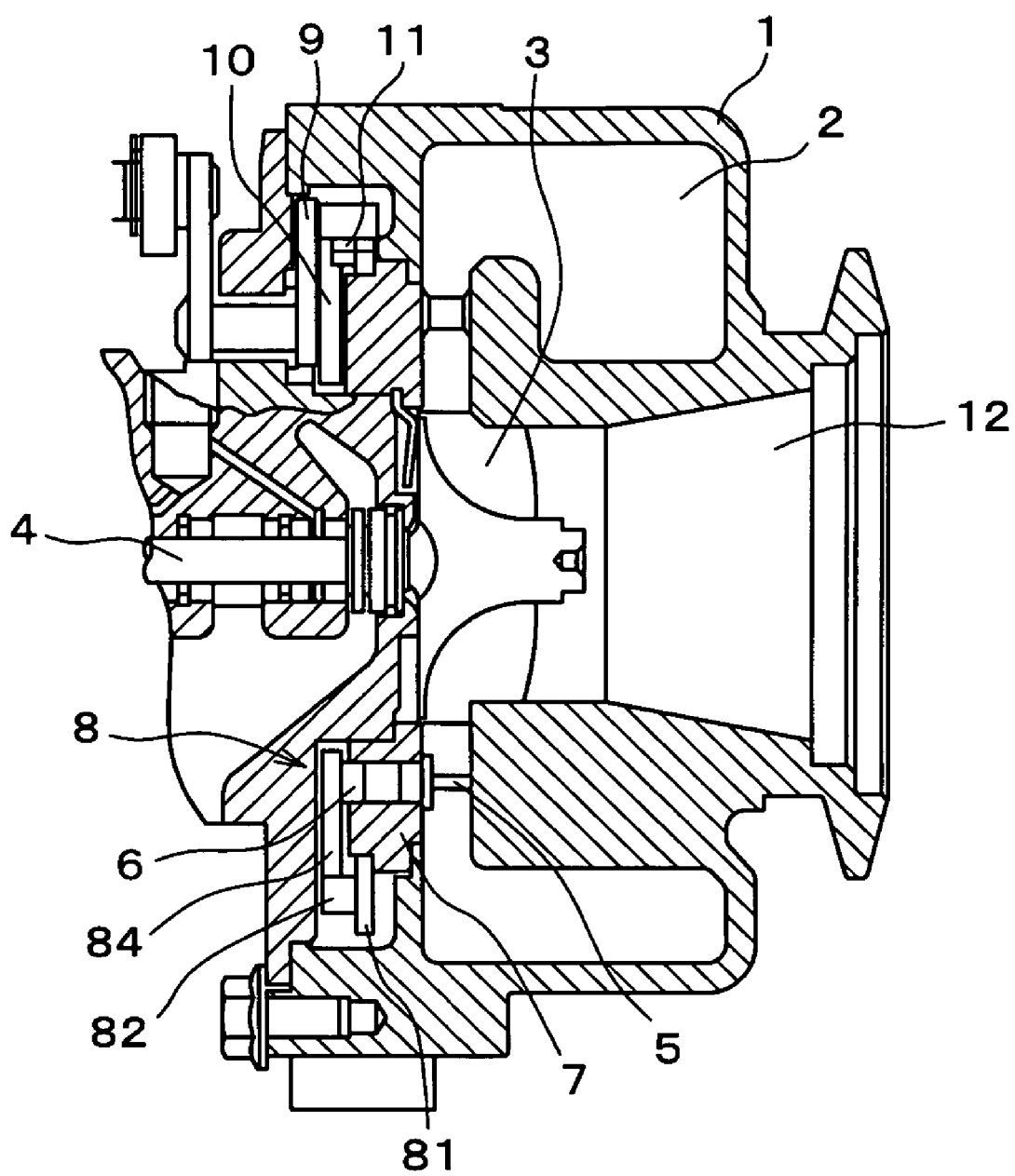
FIG. 1 is a cross-sectional view showing the configuration of a turbocharger according to one embodiment of the present invention.

FIG. 1 is a cross-sectional view showing the configuration of a turbocharger according to one embodiment of the present invention. In the drawing, a scroll 2 is formed spirally in the outer circumferential part of a turbine housing 1. Plural pieces of nozzle vanes 5 are installed at regular intervals circumferentially at the side of the inner circumference of the scroll 2. A nozzle axis 6 is formed at a wing-tip part of each of the nozzle vanes 5, and is rotatably supported by a nozzle mount 7 fixed to the turbine housing 1.

An adjustable nozzle mechanism 8 varies a vane angle of the nozzle vanes 5. A ring plate 81 is rotatably supported by the turbine housing 1, and pins 82 are fixedly arrayed in the ring plate 81 at regular intervals circumferentially. A open-close lever 84 is coaxially fixed to the nozzle axis 6, and its holding part in which the leading end of the open-close lever 84 is two-forked is engaged with the pin 82.

The crank mechanism 9 is interlinked to a driving source for the nozzle vanes 5. A lever 10 is interlinked to the crank mechanism 9. A sleeve 11 is fixed to the lever 10, and engages with the ring plate 81 of the adjustable nozzle mechanism 8 to drive and rotate the ring plate 81.

Hereinafter, an operation of the turbocharger will be described. An exhaust gas from an engine (not shown) enters into the scroll 2, and circulates along the spiral of the scroll 2 to flow into the nozzle vanes 5. The flowed-in exhaust gas passes through among the vanes of the nozzle vanes 5 to flow into a turbine rotor 3. The exhaust gas radially flows toward the center, performs an expansion behavior against the turbine rotor 3, and rotates a turbine shaft 4. Thereafter, the exhaust gas flows in its axial direction to be discharged from an exhaust port 12.

When an instruction from a vane angle control means (not shown) is set to the crank mechanism 9, the ring plate 81 of the adjustable nozzle mechanism 8 is driven to rotate via the lever 10 and the sleeve 11. The rotation of the ring plate 81 is transmitted to the nozzle vanes 5 by the rotational movement of the pins 82, the open-close levers 84, and the nozzle axes 6, and a vane angle of the nozzle vanes 5 comes to be the value set by the vane angle control means.

Figure 2A:
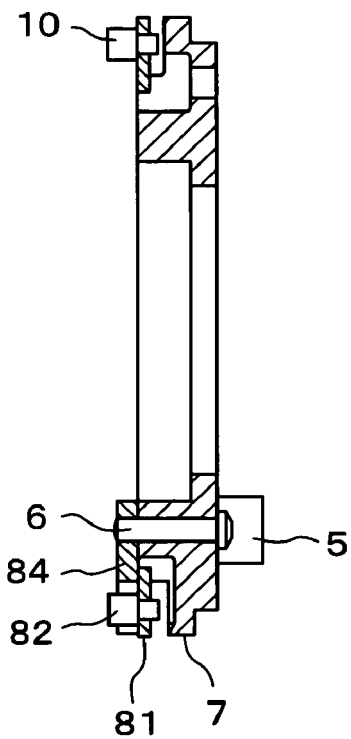
FIG. 2A and FIG. 2B are diagrams showing the configuration of an adjustable nozzle mechanism 8 of the turbocharger according to one embodiment of the present invention.
Figure 2B:
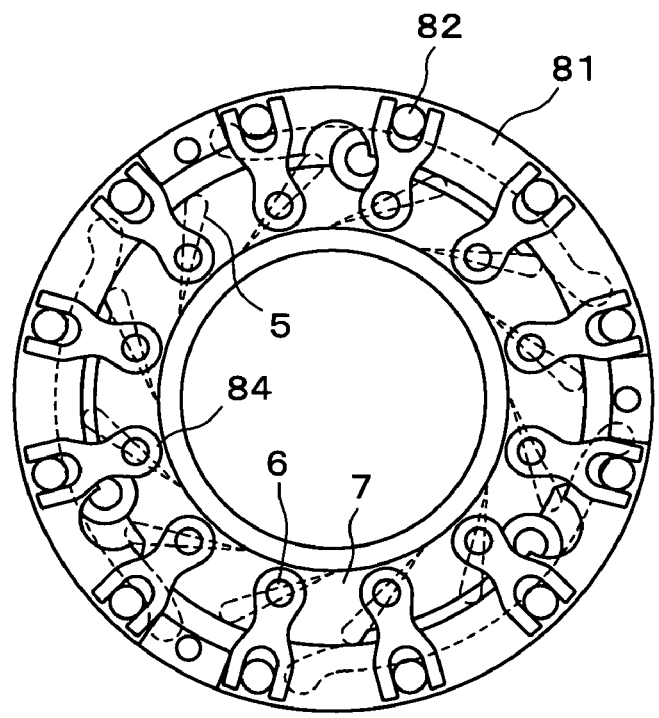

FIG. 2A and FIG. 2B are diagrams showing the configuration of the adjustable nozzle mechanism 8. FIG. 2A is a side cross-sectional view thereof, and FIG. 2B is a front view of the configuration viewed from the right of FIG. 1. A plurality of the nozzle axes 6 are provided equiangularly on the concentric circle of the nozzle mount 7, and the respective nozzle axes 6 penetrate through the nozzle mount 7 in its thickness direction so as to be rotatably supported. The open-close levers 84 are fixed at the end part on the side of the ring plates 81 of the respective nozzle axes 6, and the nozzle vanes 5 are fixed at the end part on the opposite thereof.

The two-forked holding part is formed as the leading end of the open-close lever 84, which holds the pin 82 fixedly arrayed in the ring plate 81 therebetween. The ring plate 81 and the nozzle mount 7 are coaxially installed, and are mutually rotatable. When the instruction from the vane angle control means is transmitted to the lever 10, the ring plate 81 is made to rotate, and the respective pins 82 push the holding parts of the respective open-close levers 84 to rotate the respective nozzle axes 6. As a result, the respective nozzle vanes 5 perform a synchronous open-close action centering on the respective nozzle axes 6, to control an amount of exhaust gas flowing into the turbine rotor 3.

The operation of the variable displacement turbocharger having the adjustable nozzle mechanism 8 has been described above. As is clear from the above description, a high-precision operation of the pins 82 and the open-close levers 84 for transmitting the rotational movement of the ring plate 81 and the nozzle mount 7 is required for the setting for a vane angle of the nozzle vanes 5 and the synchronous operation of the nozzle vanes 5. In particular, because the pins 82 are laterally pushed by the holding parts of the open-close levers 84 to frictionally move, the touching portions between the pins 82 and the open-close levers 84 are easily worn away. If the touching portions are worn away, the instruction from the vane angle control means is not correctly reflected in a vane angle of the nozzle vanes 5, and fluctuations are generated in vane angles of the respective nozzle vanes 5 depending on a level of wear in the respective pins 82 and the respective open-close levers 84, to disturb its synchronization operation, which degrades a high-precision operation. Accordingly, the wear resistance of the pins 82 and the open-close levers 84 is an important factor in determining the lifetime of the turbocharger.

Figure 3:
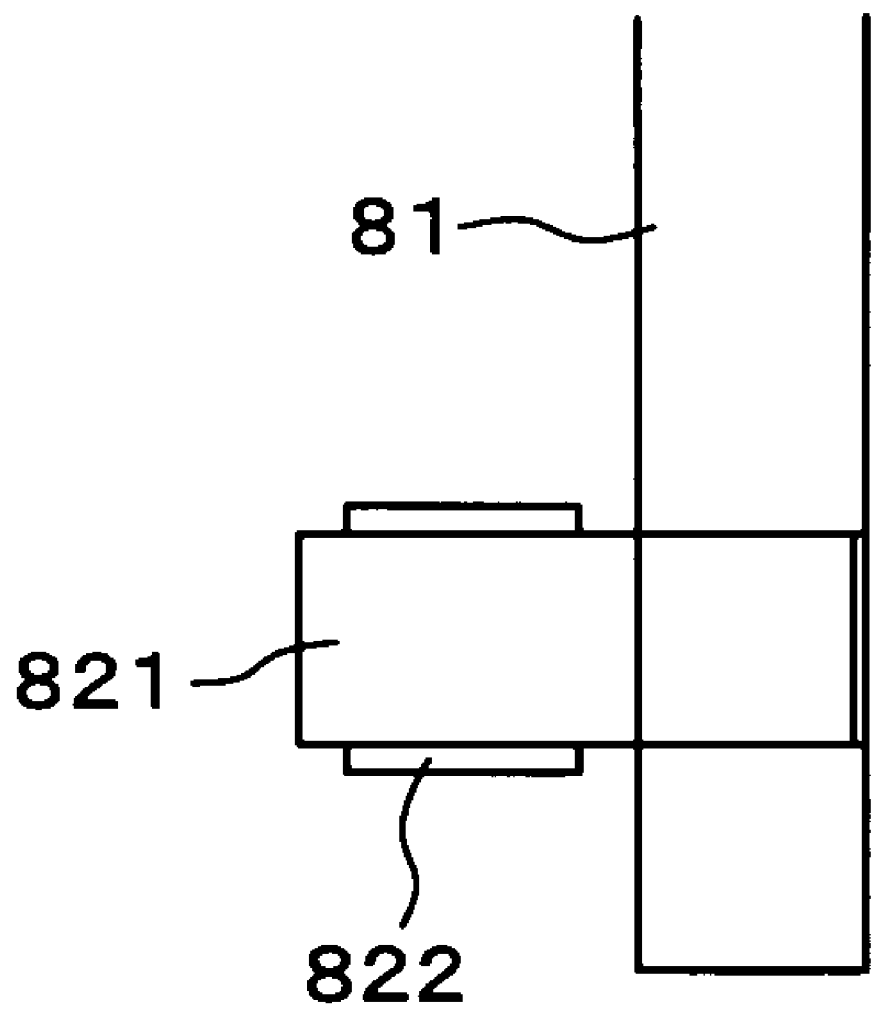
FIG. 3 is a cross-sectional view showing the configuration of a pin 82 according to one embodiment of the present invention.

FIG. 3 is a cross-sectional view showing the configuration of the pin 82 according to the embodiment of the present invention. The drawing shows a state in which the pin 82 is pressed to fit into the ring plate 81. The pin 82 is composed of a base material 821 and a coating 822. The coating 822 is selectively applied onto a portion touching the holding part of the open-close lever 84. The reason for that the coating 822 is selectively applied to the portion is, not only is it possible to obtain sufficient wear resistance performance due to the partial coating 822, but the fixing strength of the pin 82 to the ring plate 81 is also not degraded by preventing the coating 822 which is a dissimilar material from being involved with the portion on which the pin 82 is pressed into the ring plate 81.

The experimental result in which the turbocharger has been driven for 200 hours by using the pin 82 in which a hard coating with a thickness of approximately 2 μm, which is formed of Al, Cr, Si, and N by physical vapor deposition as the coating 822 is formed onto an austenitic stainless steel SUS304 as the base material 821, is shown in Table 1. The composition ratio of the coating materials is (Al$_x$Cr$_{1-x-y}$Si$_y$)(N), and $0.45<x<0.85$ and $0<y<0.35$. In Table 1, values in a conventional example in which a cobalt alloy is used as the pins 82 are shown as control sample.

TABLE 1

| | Depth of wear after use for 200 hours (Units: μm) | |
|---|---|---|
| Material of Pins 82 | Pin side | Open-close lever side |
| Conventional example (cobalt alloy) | 200 | 200-300 |
| Example of the invention (hard coating formed on SUS 304) | 0.1 or less | 20-30 |

In accordance with the above-described experimental result, when the pin 82 according to the present invention in which the hard coating with a thickness of approximately 2 μm which is formed of Al, Cr, Si, and N by physical vapor deposition is formed onto the austenitic stainless steel, is used, the depth of wear of the pin 82 is less than or equal to a two-thousandth part of that and the depth of wear of the holding part of the open-close lever 84 is about a tenth part of that in the case in which the conventional cobalt alloy is used.

Further, because the pin 82 according to the present invention shown in FIG. 3 uses stainless steel which can be plastic-processed at a low cost as a base material, the pin 82 is inexpensive as compared with the conventional cobalt alloy, and because the pin 82 is highly flexible, the pin 82 is highly resistant to lateral pushing force from the holding part of the open-close lever 84, which is durable. That is, the pin 82 in which the hard coating with a thickness of approximately 2 μm which is formed of Al, Cr, Si, and N by physical vapor deposition as the coating 822 is formed onto the austenitic stainless steel SUS304 as the base material 821 according to the present invention, has both of the advantage in which the pin 82 is highly resistant to lateral pushing force from the holding part of the open-close lever 84, which is durable, and the advantage in which wear of the respective frictionally moving parts of the pin 82 and the holding part of the open-close lever 84 are minimal.

Accordingly, it has been shown by the above result that the turbocharger using the pins 82 according to the present invention is inexpensive, and the lifetime thereof has been improved as compared with the turbocharger using the conventional cobalt alloy.

Further, in a case in which stainless steel having substantially the same coefficient of linear expansion as the pin 82 is used as the ring plate 81, for example, merely press-fitting provides fastening force, and the like, which makes it possible to more inexpensively and easily assemble the turbocharger.

Note that the present invention is not limited to the above-described embodiment. The SUS304 which is austenitic stainless steel has been used as a base material for the pin 82 in the above-described embodiment. However, another type of stainless steel or even another type of metal material which has similar rigidity, heat resistance, sufficient adhesive strength with the coating 822, and the like may be used.

Further, the hard coating due to physical vapor deposition of $(Al_xCr_{1-x-y}Si_y)(N)$ has been formed as a coating material. However, if coating materials whose indentation hardness with a load of 9.8 mN is more than or equal to approximately 2500 HV and whose oxidation starting temperature is more than or equal to approximately 1000° C., which are excellent in adhesiveness, the composition of those and a method for forming a coating are not limited to that in the above-described embodiment.

Further, the thickness of the coating 822 has been formed to be approximately 2 μm. However, the depth of wear by experiment is less than or equal to 0.1 μm/200 hours. Even in view of unevenness in coating thickness or fluctuations in its composition due to fluctuations in the processes for forming a coating, a coating thickness, which is more than or equal to 0.5 μm provides industrially sufficient strength.

Further, the coating 822 is applied to the touching portion with the open-close lever 84. However, the coating 822 may be applied to the entire surface of the base material 821 or all the other portions except for the portion on which the base material 821 is pressed into the ring plate 81.

All the publications, patents and patent applications cited in the present specification are incorporated in the present specification by reference in their entirety.

The invention claimed is:

1. A turbocharger comprising:
   a nozzle mount which rotatably supports a plurality of nozzle axes at regular intervals circumferentially, the nozzle axes are formed such that open-close levers having two-forked holding parts formed as their leading ends are fixed at one end part, and nozzle vanes that control an amount of exhaust gas to rotate a turbine rotor are fixed at the other end part; and
   a ring plate which has pins fixedly arrayed so as to correspond to the nozzle axes, to engage with the holding parts of the open-close levers, the ring plate is rotatably supported coaxially on the nozzle mount,
   wherein the pins are formed such that stainless steel is used as a base material, and the base material is coated with a hard coating formed of Al, Cr, Si, and N by physical vapor deposition.

2. The turbocharger according to claim 1, wherein a coating thickness of the hard coating is more than or equal to 0.5 μm.

3. The turbocharger according to claim 1, wherein only one portion including a frictionally moving part of the base material is selectively coated with the hard coating.

4. The turbocharger according to claim 2, wherein only one portion including a frictionally moving part of the base material is selectively coated with the hard coating.

* * * * *